A. EDWARDS.
Fruit Driers.
No. 134,528. Patented Jan. 7, 1873.
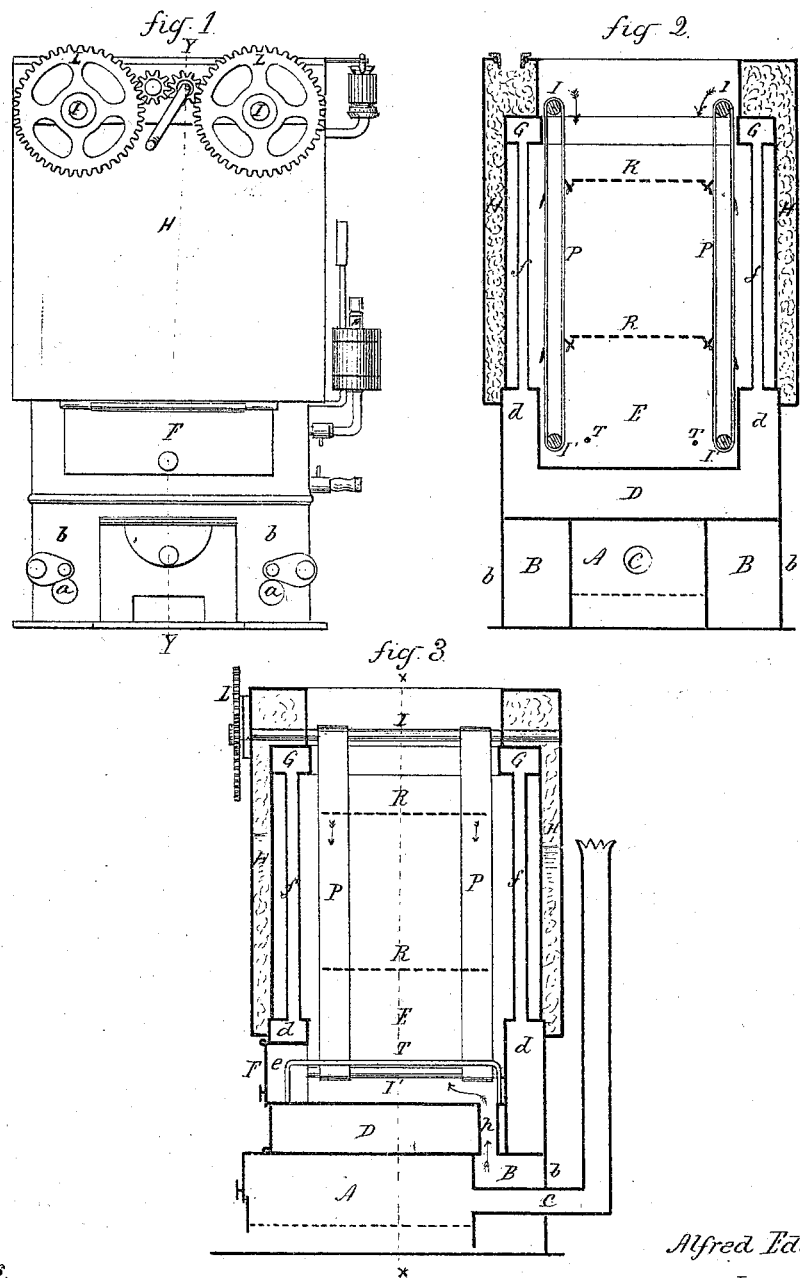

UNITED STATES PATENT OFFICE.

ALFRED EDWARDS, OF NEW HAVEN, CONNECTICUT, ASSIGNOR TO ALFRED R. EDWARDS, OF CHICAGO, ILLINOIS.

IMPROVEMENT IN FRUIT-DRIERS.

Specification forming part of Letters Patent No. 134,528, dated January 7, 1873.

*To all whom it may concern:*

Be it known that I, ALFRED EDWARDS, of New Haven, in the county of New Haven and State of Connecticut, have invented a new Improvement in Apparatus for Drying Fruit; and I do hereby declare the following, when taken in connection with the accompanying drawing and the letters of reference marked thereon, to be a full, clear, and exact description of the same, and which said drawing constitutes part of this specification, and represents, in—

Figure 1, a front view; Fig. 2, a vertical central section on line $x\ x$ of Fig. 3; and in Fig. 3, a vertical central section on line $y\ y$ of Fig. 1.

This invention relates to the construction of an apparatus for the drying of fruits; the object being to facilitate the process so that the fruit is thoroughly dried for preservation in a few moments of time; and it consists in a drying-chamber provided with vertical endless bands, or their equivalents, carrying plates from the top downward through the said chamber, upon which said plates the fruit to be dried is placed, and in which chamber a constant circulation of hot air generated from a steam or hot-water heated surface is maintained, which dries the fruit while the said plates are passing from the top to the bottom; the construction of the said apparatus more fully appearing in the following description.

A is the fire-box, within which the fire or suitable heating apparatus is placed, upon either side of which is an air-chamber, B. The gas and smoke pass from the fire-chamber through the flue C or otherwise, the said air-passage extending to the rear and around the fire-box, as seen in Fig. 3. An outer case, $b$, incloses the fire-box and forms the said chambers. Openings $a$ are made for the admission of air into the said chambers. Above the fire-box a boiler, D, is arranged to receive the water to be heated; the sides extending up, as at $d$, inclose the lower part of the chamber E, through one side of which an opening, $e$, is formed, closed by a door, F. Above the boiler and near the top of the chamber E the upper part or steam-section of the boiler G is arranged, corresponding in form to the part $d$, and surrounding the chamber E in like manner, and this is connected to the boiler below by numerous tubes, $f$, which maintain a constant heat around the chamber E. The upper parts of the boiler and tubes are inclosed by a chamber, H, filled with a non-conducting material to prevent loss from the heat within. The chamber E, open at the top, is heated from the boiler, and a circulation maintained of heated air, the air passing through the chambers B heated by the fire-box, thence through an opening, $h$, into the chamber E. Upon opposite sides of the chamber E at the top a shaft, I, is arranged, to which a revolution is imparted by gears L attached upon the outside and made to revolve in opposite directions. A similar shaft, I', is placed at each side at the bottom, and around these endless bands, chains, or equivalent devices, P, are arranged to traverse downward, as denoted by the arrows. On these bands arrangement is made for the attachment of open or perforated plates R, as seen in Fig. 3. These are placed in position upon the bands at the top, the fruit to be dried laid loosely thereon; then, the bands moving slowly, the plates thus introduced pass slowly down through the chamber E; the air, circulating freely through the plates and fruit thereon, completely dries the fruit by the time it has reached the bottom. At the bottom, opposite the opening $e$, bars T are arranged, upon which the plates strike, the band passing on and leaving the plate on the said bars; then the door F is opened and the plate with the dried fruit removed; and so continuing, the plates being successively placed in at the top with the green fruit, passing down through the heated chamber, and removed when dried.

The heat being as great as the fruit will bear and not cook, and a constant circulation maintained, the passage down occupies but a few minutes, and is sufficient to thoroughly dry the fruit.

The quantity of air admitted may be regulated at the openings.

The usual attachments for steam-boilers should be applied for the inlet of water, escape of steam, safety, &c.

Instead of water in the boiler, live steam may be admitted from other sources, the fire serving to heat the air and superheat the steam. I, however, prefer water in the boiler, as described.

I claim as my invention—

The chamber E within a vertical steam or water heating apparatus, provided with the shafts I I' and endless bands P, or their equivalents, arranged to receive and carry the plates R, and constructed for the flow of heated air into and through the said chamber, in the manner and for the purpose described.

ALFRED EDWARDS.

Witnesses:
A. J. TIBBITS,
J. H. SHUMWAY.